Patented Dec. 3, 1929

1,738,343

UNITED STATES PATENT OFFICE

ALOIS ZINKE, OF GRAZ, AUSTRIA, ASSIGNOR TO FELICE BENSA, OF GENOA, ITALY

PROCESS FOR MANUFACTURING CHLOROPERYLENE QUINONES

No Drawing. Application filed June 7, 1927, Serial No. 197,227, and in Austria November 26, 1926.

A process is known by which low chlorinated perylenes are converted into quinones by the treatment with concentrated sulphuric acid at a high temperature, 140° centigrade, oxygen being introduced, the chlorine atoms being removed. As contradistinguished therefrom it has been found by careful experiments with chloro perylenes having at least eight chlorine atoms combined with the perylene nucleus and more particularly with dodekachloroperylene that in a similar way not a quinone free from chlorine is arrived at, but quinones are obtained in which, however, a comparatively large number of the chlorine atoms of the highly chlorinated perylenes is retained.

The invention relates to a process for the manufacture of such chloroperylene quinones which process consists essentially in, that chloro perylenes having at least eight chlorine atoms combined with perylene nucleus and more particularly dodekachloroperylene are treated with fuming sulphuric acid at a temperature between 130 and 180° centigrade. Thereby compounds are obtained which contain besides oxygen comparatively large quantities of chlorine and may be used as vat dyestuffs.

*Example*

2 parts by weight of dodekachloroperylene are introduced into 100–120 parts by weight of fuming sulphuric acid containing 25% of anhydride and the whole is kept at a temperature of 150 to 160° centigrade during 3½ hours. Under separation of chlorine and hydrochloric acids the liquid at first becomes dark green and after continued heating changes first into blue and then into a deep dark blue. At the end of the reaction the reaction product is separated by pouring into water. The product separated by filtration is of a dark violet colour with a greenish metallic lustre. For purifying it is recrystallized preferably from hot nitrobenzene in which the product is readily soluble with a wine red colour. In alcohol, bisulphide of carbon, tetrachloride of carbon, acetone and glacial acetic acid the new compound is not at all or very difficulty soluble. It is rather difficultly soluble in boiling benzol, xylol and toluol. On heating up to 360° centigrade a point of fusion could not be observed. The product gives a vat of intense blood red colour, cotton takes it up with the same colour, on exposure to air the cotton becomes dark olive green in case of a concentrated vat. By a subsequent treatment with solutions of metal salts such as solutions of iron or chromium salts the colour becomes red to violet tinged. Similar compounds may be obtained from octo-, nono-, deka- and hendekachloroperylenes by the same method.

The final product obtained in the example hereinbefore described contains 47.5% of Cl as has been found by analysis, its constitutional formula is probably

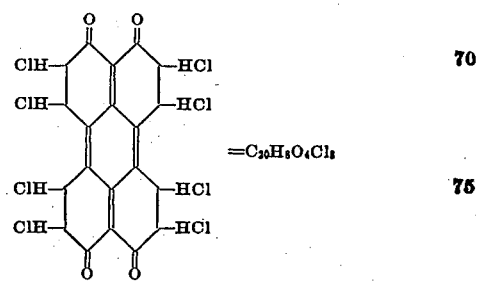

This final product might be called octo-chloro octo-hydroperylene diquinone, the ClH groups occupying the positions 1, 2, 5, 6, 7, 8, 11, 12 and the O atoms occupying the positions 3, 4, 9, 10 in the perylene nucleus.

The highly chlorinated perylenes herein referred to may be obtained by a method forming the subject matter of an application for the "Manufacture of highly chlorinated perylenes" filed simultaneously with the present one by Alois Zinke and Konrad Funke jointly, and serially numbered 197,229 (now Patent Number 1,681,077). This method consists in passing dried gaseous chlorine through a suspension or solution of perylene or low chlorinated perylenes in an inert solvent such as nitrobenzene to which an inorganic chloride such as aluminium chloride or pentochloride of antimony is added.

As stated in Patent No. 1,681,077 referred to above, the octo- to dodekachloroperylenes are not merely substitution products but contain besides substitution chlorine atom also addition chlorine atoms. Thus the empiric formula of dodekachloroperylene is $C_{20}Cl_4(HCl)_8$, the Cl atoms being probably in the 3, 4, 9, 10 positions while the HCl groups in which Cl is simply in addition relation, are probably in the 1, 2, 5, 6, 7, 8, 11, 12 positions. Now by the action of fuming sulphuric acid O atoms are substituted for the Cl atoms, double bonds being of course dissolved, while the HCl groups are not affected by the fuming sulphuric acid so that the final product has the O atoms in the 3, 4, 9, 10 positions, the other positions being occupied by the unaltered HCl groups as indicated in the above structural formula.

What I claim is:

1. A process for manufacturing chloroperylene quinones consisting in treating chloro perylenes having at least eight chlorine atoms combined with the perylene nucleus with fuming sulphuric acid at a temperature of 130 to 180° centigrade.

2. A process for manufacturing chloroperylene quinones consisting in treating dodekachloroperylene with fuming sulphuric acid at a temperature of 150 to 160° centigrade.

3. As a new article of manufacture octochloro- octo- hydro perylene-diquinone.

In testimony whereof I affixed my signature.

ALOIS ZINKE.